United States Patent [19]

Darrieux

[11] Patent Number: 5,358,594
[45] Date of Patent: Oct. 25, 1994

[54] DEVICE AND METHOD TO EMBODY A COMPLEX STRUCTURAL PIECE BY WIRE OR STRIP CONTACT PLACING

[75] Inventor: Jean-Louis Darrieux, Saint Medard en Jalles, France

[73] Assignee: Aerospatiale Societe Nationale Industrielle, Paris, France

[21] Appl. No.: 12,853

[22] Filed: Feb. 3, 1993

[30] Foreign Application Priority Data

Feb. 17, 1992 [FR] France .................. 92 01747

[51] Int. Cl.⁵ ............................................. B65H 81/00
[52] U.S. Cl. ........................................ 156/433; 156/523; 156/574
[58] Field of Search .............. 156/166, 173, 175, 425, 156/433, 574, 523, 361, 363; 74/405, 352

[56] References Cited

U.S. PATENT DOCUMENTS

| | | | |
|---|---|---|---|
| 638,194 | 11/1899 | Arnold | 74/405 |
| 3,943,786 | 3/1976 | Mills | 74/405 |
| 4,182,645 | 1/1980 | Hill | 156/361 |
| 4,669,333 | 6/1987 | Matsuda et al. | 74/352 X |
| 4,679,291 | 7/1987 | Schmeal et al. | |
| 4,909,880 | 3/1990 | Kittelson et al. | |
| 4,960,006 | 10/1990 | Moore | 74/405 X |

FOREIGN PATENT DOCUMENTS

| | | |
|---|---|---|
| 0361828 | 4/1990 | European Pat. Off. . |
| 2132134 | 7/1984 | United Kingdom . |

*Primary Examiner*—Jeff H. Aftergut
*Attorney, Agent, or Firm*—Nikaido, Marmelstein, Murray & Oram

[57] ABSTRACT

The device consists of a placing head whose wire drive roller and placing wheel are interconnected by an intermediate gear which may be retracted so as to disconnect them, said placing head being translation-mobile with respect to the distributing machine/head interface, complementary means providing a variable pressure of the placing head on the shape.

Application for wire placing so as to form a complex structural piece.

13 Claims, 6 Drawing Sheets

DEVICE AND METHOD TO EMBODY A COMPLEX STRUCTURAL PIECE BY WIRE OR STRIP CONTACT PLACING

FIELD OF THE INVENTION

The invention, which concerns a device and method to embody a complex structural piece by the wire or strip contact placing on a form, more particularly concerns the disposition of placing rollers and for driving the wire of the placing head.

BACKGROUND OF THE INVENTION

The device is able to embody large pieces having a complex section, especially pieces similar to those made of a light alloy produced in an aircraft sheet rolling mill, that is plates reinforced by ribs made of three-directional composite materials, needing to resist mechanical and thermic stresses in an oxidizing environment. These structures, derived from fibrated prefabricated pieces kept in shape by a binding agent and assembled during placing of the third direction, are stiffened in a mold so as to obtain the final geometry of the piece and then, if necessary, machined with the desired shapes and dimensions.

There is a large number of techniques able to embody flat or bulged plates formed of layers in parallel planes obtained via fiber orientation in two dimensions, these techniques using preimpregnated fibers or wires supported by a continuity strip and with layer isolation, said strip needing to be removed when the wire is placed and rewound behind the placing head. The wire is driven by the continuity strip, the latter also being driven by a rotary-motorized placing roller. So as to embody the third direction, that is so as to introduce transverse fibers through superimposed substrates, these known techniques use a large number of pins which help to support the transverse fibers and which subsequently need to be removed.

These known techniques do have a certain number of drawbacks. Firstly, the need to realize the placing of a wire on a support strip and then of storing these on disk-shaped coils limit the quantity of stored wire and their dimensions encumber the placing head. In addition, the motorization of a contact roller constitutes a complication in embodying a placing head. It is also known that the operations for preimpregnating the wire prohibit the use of certain resin moulds. Finally, the use of pins proves to be a hindrance during placing of the third direction.

SUMMARY OF THE INVENTION

With the aim of avoiding these drawbacks so as to more easily obtain complex structures whose orientation fibers of the nonwoven elementary pieces is disposed along the desired directions so as to obtain the best possible mechanical characteristics, the invention offers using a device able to embody complex structures comprising small bending radii required in particular by the need for local reinforcements without using pins. For example, it is possible to obtain a ribbed plate whose third direction is used to link the prefabricated fibrated pieces in two directions by wire contact placing. The invention is able to embody complex pieces in which the fiber orientations of the nonwoven elementary pieces are disposed along the desired directions so as to obtain the best possible mechanical characteristics. It is also possible to obtain structures assembled with a binding agent allowing for handling of prefabricated substrates assembled prior to final stiffening.

One main object of the present invention thus consists of a device to embody a complex structural piece by the contact placing of a wire or strip on a form and using a placing head mounted on a tool forming part of a wire distributing machine, said placing head being equipped with a plurality of rollers with at least one driving roller and one placing wheel, a device according to which the roller for driving the wire and the placing wheel are interconnected by an intermediate gear which may be retracted so as to disconnect them, said placing head being translation-mobile with respect to the distributing machine/head interface, complementary means providing a variable pressure of the placing head on the shape.

According to one particular characteristic of the invention, the placing wheel is offset with respect to the axis of rotation of the placing head. According to other characteristics of the invention, the wire goes round the drive roller against which it is plated by two presser rollers, and the drive roller and the placing wheel each respectively bear a gear driven by said intermediate gear which moves on a ramp under the action of a jack.

In addition, a rack driven by a jack is provided upstream of the presser roller so as to inject the wire and a cutting blade moves preferably in the same direction as the intermediate gear between the placing wheel and the drive roller.

According to the invention, the distributing machine/head interface is constituted by a support plate mounted in free rotation on the axis of the tool forming part of the distributing machine, said tool used as a support for a distributing coil of the wire which rotates freely on it and which is equipped with an adjustable brake.

The wire emitted by the coil traverses the tool via a central well so as to reach the placing head.

Advantageously, the complementary device is a spring in support on the support plate and the placing head so as to have the latter slide in the direction of the piece to be covered.

Another object of the invention consists of a method to embody a complex structure made of a composite material implementing the device, said method consisting of:

embodying a elementary piece in two directions by placing a first layer of a dry wire in contact on a form coated with a binding agent, the first layer embodied being completed by at least one other binding agent and wire layer placed in another direction until the desired thickness of the elementary piece is obtained, stitching on the elementary piece a wire of the same type in a third direction prior to resin impregnation and hardening of the binding agent.

According to one preferential variant of the invention, the method also consists of:

embodying at least two elementary pieces in two directions by placing a first dry wire layer in contact on a form coated with a binding agent, the first layer embodied being completed by at least one other binding agent and wire layer placed in another direction until the thickness of the desired elementary pieces is obtained.

superimposing the obtained elementary pieces on a foam support, and binding together the elementary pieces by placing wires of the same type in a third direction prior to resin impregnation and hardening of the binding agent.

BRIEF DESCRIPTION OF THE DRAWINGS

Other characteristics and advantages of the invention shall appear more readily from a reading of the following description with reference to the accompanying drawings on which.

DETAILED DESCRIPTION OF THE PREFERRED EMBODIMENTS

Figure 1:
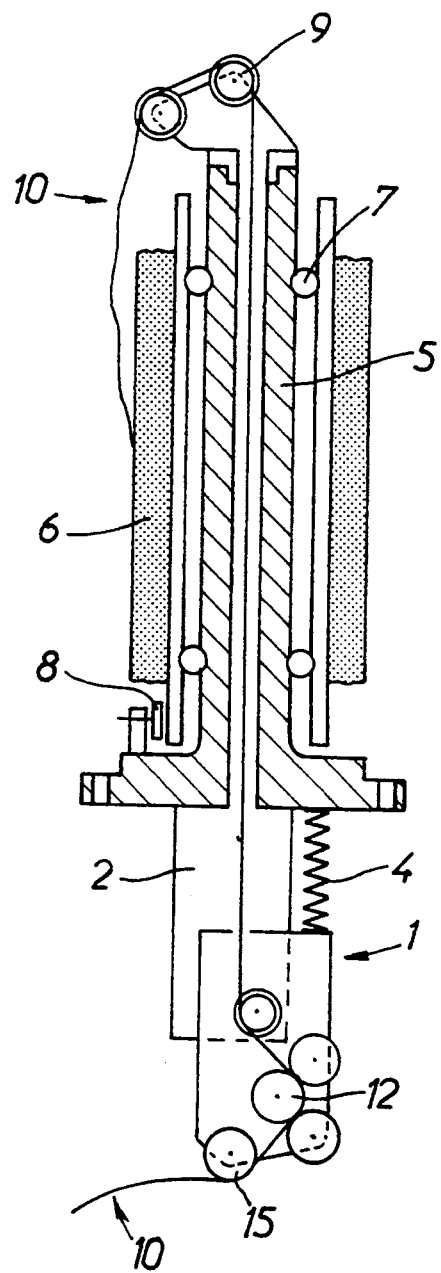
FIG. 1 is a vertical cutway view of the placing head and the tool.

FIG. 1 shows a placing head denoted by the reference 1. It is mounted sliding on a slide 2 integral with a tool 5 and a spring 4 acts on the head so as to exert a pressure on the form to be covered. The surface against which the spring presses constitutes the interface between the placing head 1 and the tool forming part of the wire distributing machine. The tool in question is used as a support for a coil 6 distributing a wire 10 which is able to rotate freely on the tool by means of roller bearings 7. An adjustable brake 8 is able to act on rotation of the coil. The wire 10 emitted by the coil is guided by return pulleys 9 and traverses the tool via a central well so as to reach the placing head 1.

Figure 2:
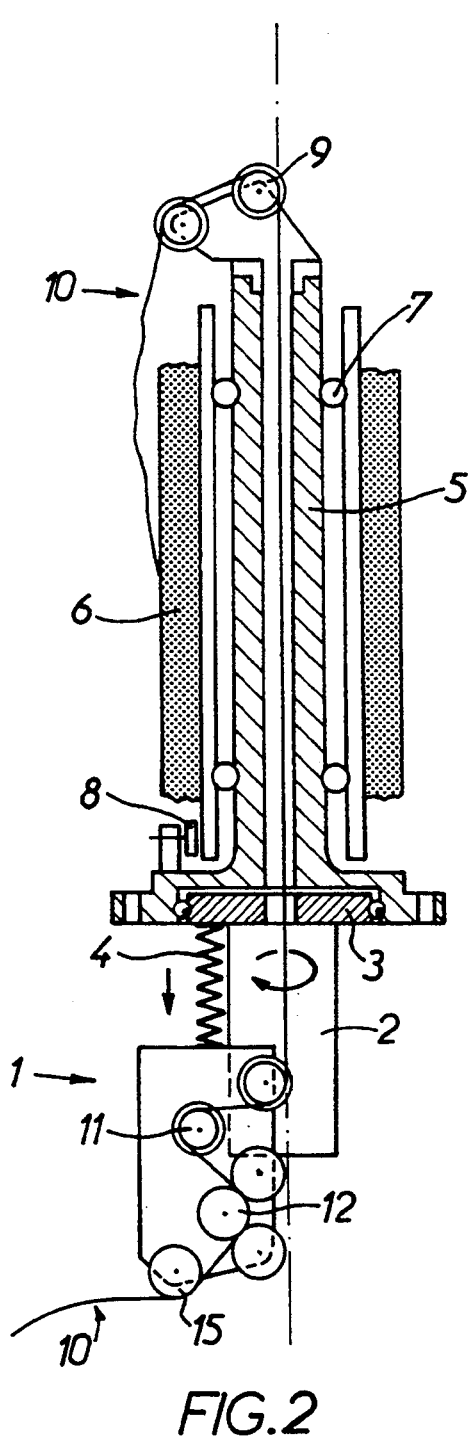
FIG. 2 is an embodiment variant of the placing head according to FIG. 1.

One embodiment variant is shown in FIG. 2 on which the same elements bear the same references. In this variant, the placing head 1 is offset with respect to the axis of rotation. In addition, the slide 2 is integral with a support plate 3 mounted in free rotation on the axis of the tool 5, said plate constituting the interface between the placing head and the tool.

Figure 3:
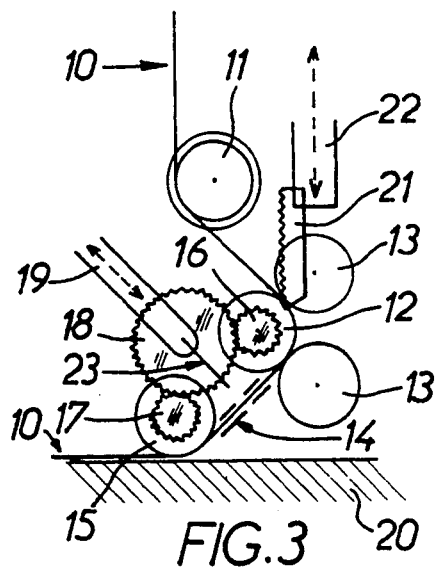
FIG. 3 is a diagrammatic front view of the details of the placing head.

The placing head is shown in more detail on FIG. 3. The wire 10 has first of all reached a return pulley 11 which orientates it in the direction of a drive roller 12 which it goes round and on which it is placed by two presser rollers 13. Then the wire traverses a guide tube 14 before going round a placing wheel 15 in contact intended to be applied to the complex-shaped piece. In the case of the variant of FIG. 2, the placing wheel 15 is offset with respect to the axis of rotation of the placing head 1 which moreover is mounted loose on the axis of the tool. Thus, it is possible to use the latter on the most simple type of machines not having any axis of rotation controlled by the tool.

The drive roller 12 bears a gear 16 and the placing wheel 15 bears a similar gear 17. The two gears 16 and 17 are able to be coupled by an intermediate gear 18 which is able to move onto the ramp 19 under the action of a jack (not shown). In addition, upstream of the presser roller is a rack 21 for injecting the wire into the head at the start of the operation, said head being driven by a pneumatic jack 22. Finally, a cutting blade 23 has been installed and moves in the same direction as the intermediate gear 18 between the placing wheel and the drive roller. The placing head as described above is therefore translation-mobile with respect to the interface which enables the wire to be plated on the piece by the spring 4 which pushes the placing head, said spring being more or less stretched so as to exert the desired pressure on the piece.

Figure 4:
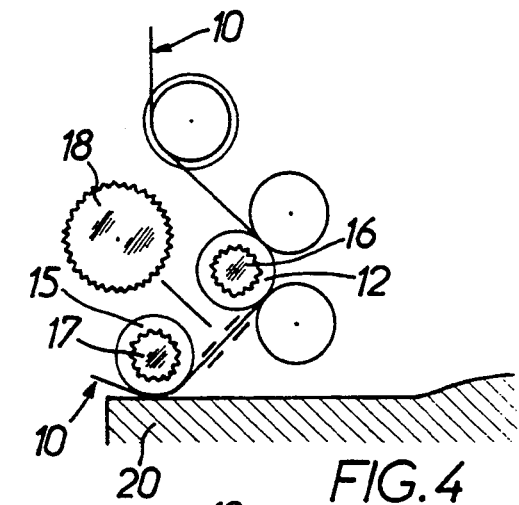
FIGS. 4 to 8 are diagrammatic views of the placing head according to FIG. 2 during the successive operating phases.
Figure 5:
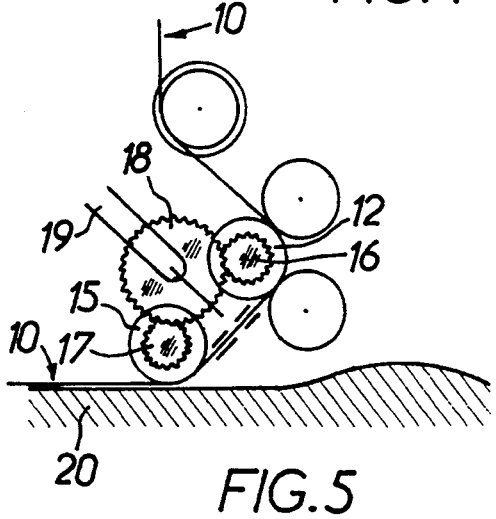
Figure 6:
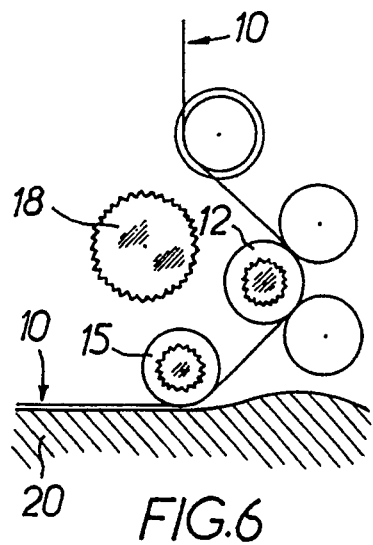

In order to place a wire in contact on a support so as to embody a first ply or ply contiguous to the first ply or a strip, the first operation consists of moving the placing head 1 with the carrier tool 5 until the placing wheel 15 abuts against the piece 20 (FIG. 4). The wire portion 10 going past the small wheel and not plated on the piece shall do so on return of the head when it shall place in contact the next contiguous ply. The descent of the tool is halted and the head is applied to the piece under the action of the spring 4. In this position, the intermediate gear 18 is on one side of the gears 16 and 17 which are not coupled. So as to ensure placing on contact, it is advisable to gear this intermediate gear 18, as shown on FIG. 5, by making it move onto the ramp 19 so that, with the aid of the gears 16 and 17, couples the drive roller 12 and the placing wheel 15. As the piece 20 is driven in rotation, the placing head 15 rolls over its surface and consequently drives the roller 12 which pulls the wire. At the end of a certain wire length glued to the piece, it is no longer necessary to have the wire pulled by the roller 12 since the latter is sufficiently hooked to the piece so as to be driven by the latter. Thus, it is possible to disengage the intermediate gear 18 (FIG. 6).

Figure 7:
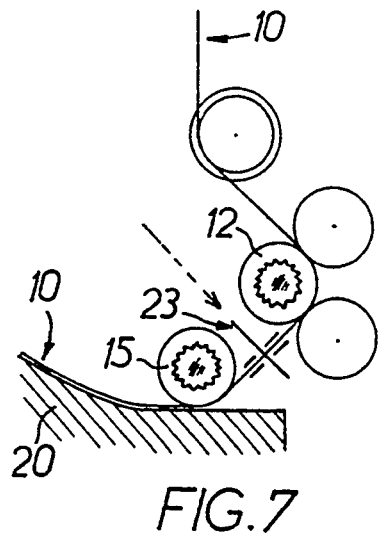

Therefore, it is possible to place the wire on a complex, convex or concave form. FIG. 7 shows that, after the contact placing of the wire 10, the cutting blade 23 starts acting so as to cut it and thus the remaining portion of the wire between the blade and the placing wheel 15 shall be plated by the latter on the piece.

Figure 8:
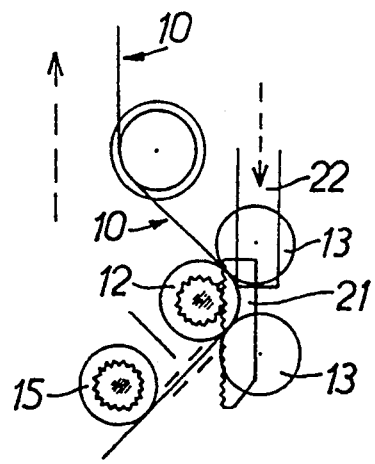

Once the placing operation has ended, the placing head shall move up in the direction of the arrow (FIG. 8) and then, with the aid of the rack 21 activated by the jack 22, a new wire 10, if required, shall be injected between the drive roller 12 and the presser rollers 13. The placing head is then ready for contact placing of a ply contiguous to the preceding ply.

Figure 9:
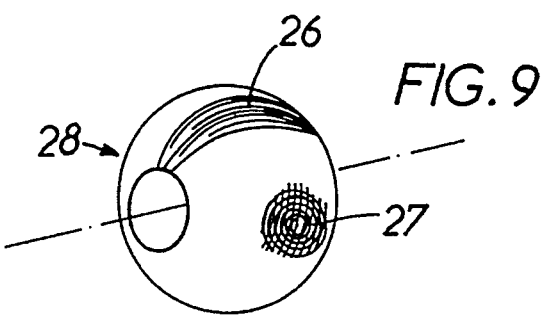
FIGS. 9 and 10 are examples of placings carried out.
Figure 10:
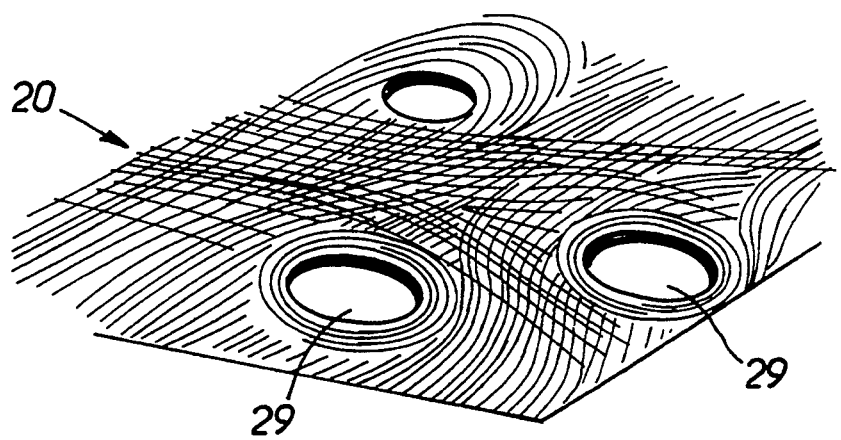

The possibility of starting and stopping the placing of a wire makes it possible to embody nonextractable layers with patterns stemming from complex forms. Thus, it is possible to place trajectory portions 26 and reinforced zones 27 on a spherical support 28 (FIG. 9). Generally speaking, it is possible to combine any type of placings on varied forms. This technique is particularly advantageous for obtaining on a support 20 with any shape complex trajectory portions which, for example, makes it possible to avoid but also reinforce zones comprising holes 29, as shown on FIG. 10.

Figure 11:
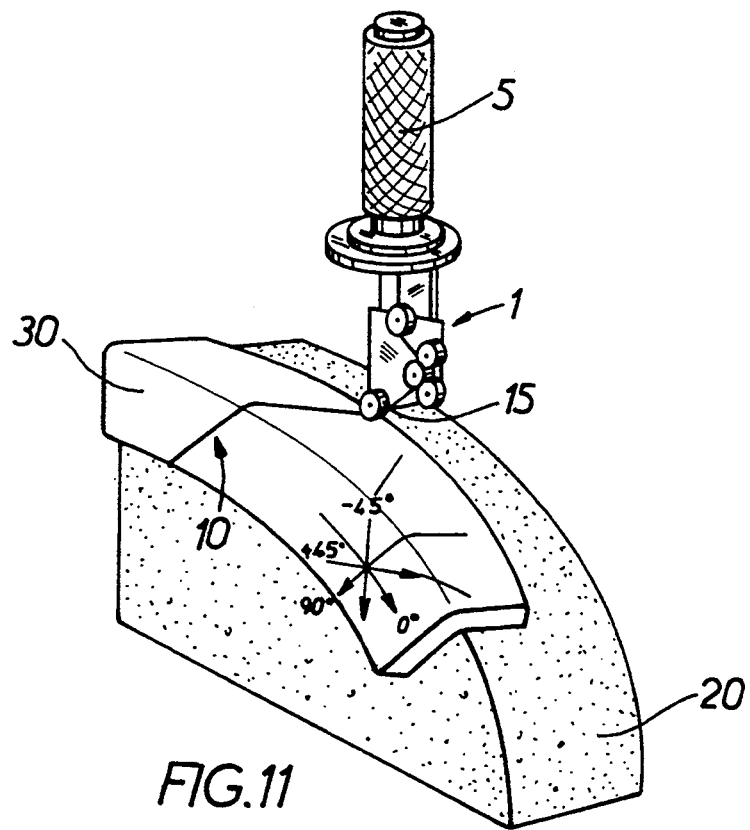
FIG. 11 is a perspective view of a head for placing a wire on a half-reinforcement.

The piece shown on FIG. 11 is a half-reinforcement 30 embodied via the superimposing of continguous wires on a foam support 20. It is obtained by virtue of the placing head 1 described earlier mounted on the tool 5. It is noted that the wire 10 placed by the small wheel 15 may be plated along different directions at each layer, such as 0, 90 or ±45 degrees. Similarly, it is possible to embody a half-reinforcement symmetrical to the preceding one above the opposing foam support edge.

Figure 12:
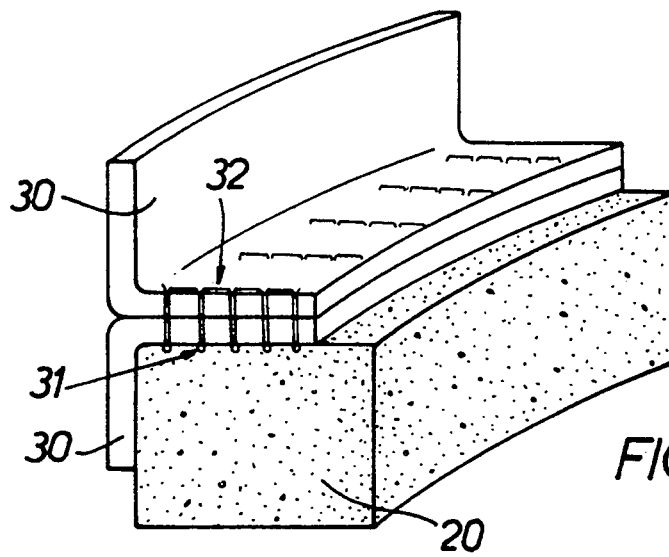
FIGS. 12 to 14 are embodiment examples for assembling elementary pieces.

Two half-reinforcements 30 obtained in this way may be interconnected, as shown on FIG. 12. In order to achieve this, wire stitchings constituting the third direction form plush loops 31 in the rigid foam and couplings 32 on one half-reinforcement. The same operation may be effected by returning the piece so as to obtain these stitchings on the two sides of the elementary pieces. Thus, a T-shaped piece is embodied constituting a reinforcement whose core is already in three directions. Should the wings of the reinforcements 30 not be linked to another piece, these are also stitched so as to embody the third direction.

Figure 13:
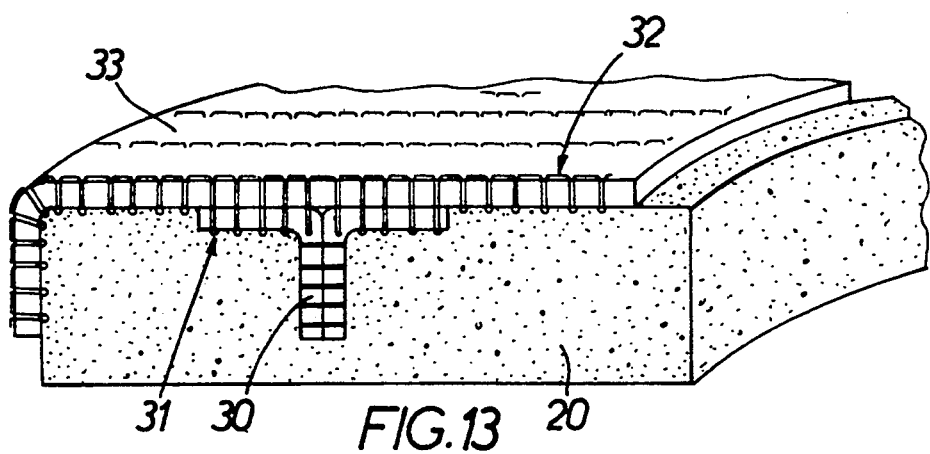
Figure 14:
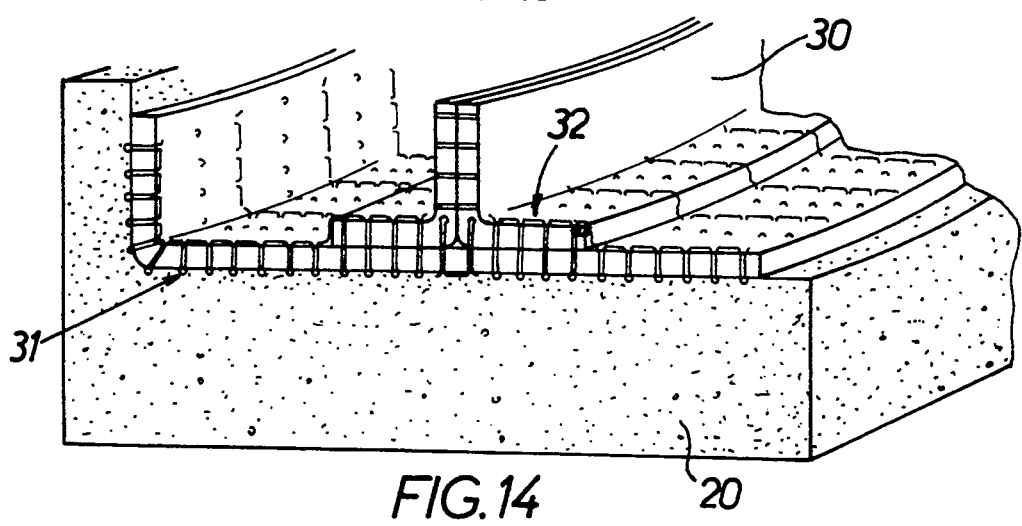

Via the contact placing of a wire, it is also possible to embody a skin 33 above these two linked half-reinforcements 30 by superimposing several layers of contiguous wires with different directions at each layer (0, 90 and ±45 degrees) as for embodiment of the half-reinforcement. The third direction is also constituted by stitchings of wires with plush loops 31 and coupling 32, as shown on FIG. 13. Stitching is effected on face A of said skin 33 and could then be so by face B when the structure has returned, as shown on FIG. 14. The stitching of this third direction shall be made at a depth compatible with the usual thickness of the skin of the casing or with the thickness corresponding to the superimposition of the reinforcements. Quite clearly, it is possible to firstly embody the "skin" portion in the way the reinforcement pieces have been embodied. A tool made of various materials according to the nature of the binding agent makes it possible to calibrate and guarantee the geometry and provide a good surface finish to the composite piece. The binding agent may be polymerized so as to stiffen the piece. After stiffening, the piece is removed from its tooling.

Figure 15:
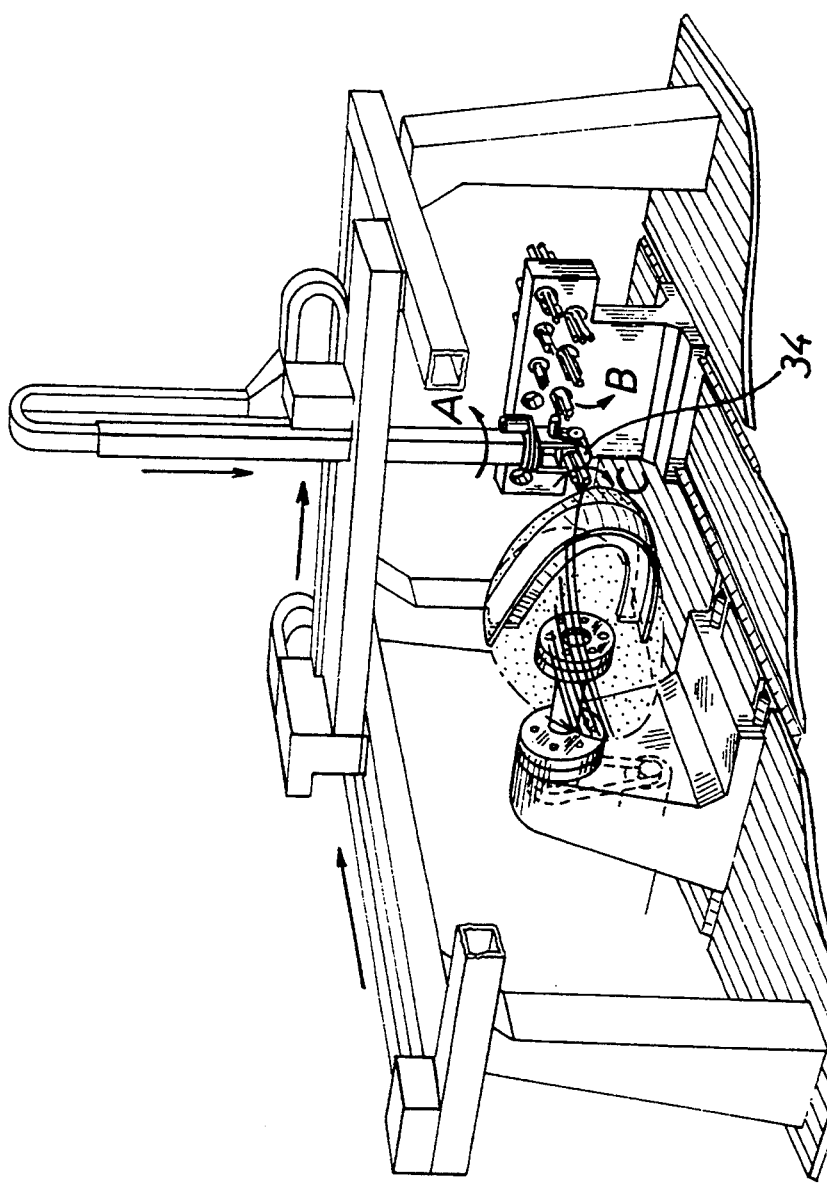
FIG. 15 is a general view of the placing machine.

The machine able to produce complex pieces by means of contact wire placing is preferably a portico machine shown on FIG. 15 allowing for the three linear movements in the three directions. At the end of the arm bearing the tool, a handle 34 allows for three other movements with the rotational axes A, B and C.

The machine is able to embody aircraft or space shuttle pieces and in particular the leading edges of said pieces subjected to strong thermic and mechanical stresses.

What is claimed is:

1. A device to embody a complex structural piece by a wire contact placing on a form comprising
 a placing head, with an axis of rotation, mounted on a tool, with a center axis, forming part of a wire distributing machine, wherein said placing head is translation mobile with respect to a distributing interface between said tool and said placing head;
 complementary means for providing variable pressure on said placing head, disposed between said placing head and said tool;
 said placing head comprising a plurality of rollers with at least one drive roller and one placing wheel; and
 a retractable intermediate gear with a retracted position and a non-retracted position, wherein when said intermediate gear is in a non-retracted position said intermediate gear interconnects said drive roller and said placing wheel.

2. A device according to claim 1, wherein said placing wheel is offset with respect to said axis of rotation of said placing head.

3. A device according to claim 1, further comprising two presser rollers disposed adjacent to said drive roller for placed a wire on the drive roller.

4. A device according to claim 1, further comprising a drive roller gear connected to said drive roller for connecting said drive roller to said intermediate gear in said non-retracted position; and a placing wheel gear connected to said placing wheel for connecting said placing wheel to said intermediate gear when in said non-retracted position.

5. A device according to claim 1 or 4, further comprising
 a ramp; and
 a jack for moving said intermediate gear between said retracted and non-retracted position along said ramp.

6. A device according to claim 1, further comprising a rack for injecting a wire from said wire distributing machine to said drive roller.

7. A device according to claim 1, further comprising a cutting blade for cutting a wire between said placing wheel and said drive roller.

8. A device according to claim 1, further comprising a support plate mounted in free rotation on said axis of said tool.

9. A device according to claim 8, further comprising a wire distributing coil support mounted on said tool for supporting a freely rotatable wire distributing coil; and an adjustable brake for controlling the speed of rotation of a wire distributing coil mounted on said wire distributing coil support.

10. A device according to claim 1 further comprising a center well disposed in said tool for allowing wire from a wire distributing coil from placing through the tool to said placing head.

11. A device according to claim 8 further comprising a center well disposed in said tool for allowing wire from a wire distributing coil from placing through the tool to said placing head.

12. A device according to claim 9 further comprising a center well disposed in said tool for allowing wire from a wire distributing coil from placing through the tool to said placing head.

13. A device according to claim 1 wherein the complementary means comprises a spring.

* * * * *